(12) United States Patent
Hecht

(10) Patent No.: US 8,556,551 B2
(45) Date of Patent: Oct. 15, 2013

(54) CUTTING TOOL HAVING A SHANK-MOUNTED ADJUSTMENT RING

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 228 days.

(21) Appl. No.: 13/284,463

(22) Filed: Oct. 28, 2011

(65) Prior Publication Data

US 2012/0163936 A1    Jun. 28, 2012

(30) Foreign Application Priority Data

Dec. 22, 2010 (IL) .......................... 210165

(51) Int. Cl.
*B23B 29/02* (2006.01)

(52) U.S. Cl.
USPC ............................. 408/156; 408/153; 408/181

(58) Field of Classification Search
USPC ................................. 408/156, 154, 181, 153
See application file for complete search history.

(56) References Cited

U.S. PATENT DOCUMENTS

| 4,776,734 | A |   | 10/1988 | Buettiker et al. |
|---|---|---|---|---|
| 5,249,895 | A | * | 10/1993 | Blaser ........................... 408/156 |
| 6,557,445 | B1 | * | 5/2003 | Ishikawa ........................ 82/158 |
| 7,037,053 | B2 |   | 5/2006 | Matsumoto et al. |
| 7,165,923 | B2 |   | 1/2007 | Matsumoto et al. |
| 7,320,568 | B2 | * | 1/2008 | Matsumoto et al. .......... 409/234 |

FOREIGN PATENT DOCUMENTS

| CH | 237 045 | A |   | 3/1945 |
|---|---|---|---|---|
| EP | 418041 | A2 | * | 3/1991 |
| EP | 1080832 | A2 | * | 3/2001 |
| FR | 2586951 | A1 | * | 3/1987 |
| GB | 2 356 828 |   |   | 6/2001 |
| SU | 986622 | A | * | 1/1983 |

OTHER PUBLICATIONS

International Search report dated Feb. 20, 2012 issued in counterpart PCT Application No. PCT/IL2011/000906.

* cited by examiner

*Primary Examiner* — Daniel Howell
*Assistant Examiner* — Nicole N Ramos
(74) *Attorney, Agent, or Firm* — Womble Carlyle

(57) ABSTRACT

A cutting tool has a shank with a circumferential groove and an adjustment ring releasably secured to the shank at the groove. The adjustment ring has a threaded through bore in which a screw is screw mounted and engages the groove. The adjustment ring has an adjustment member which engages the groove and which is positioned diametrically opposite the threaded through bore. When the screw is tightened it exert a purely radially directed force on the groove thereby inducing displacement of the adjustment member radially inwardly and the adjustment member exerts non-radially directed forces on the groove, thereby inducing a bending moment on the shank for correction of radial runout.

23 Claims, 3 Drawing Sheets

CUTTING TOOL HAVING A SHANK-MOUNTED ADJUSTMENT RING

FIELD OF THE INVENTION

The present invention relates cutting tools with radial runout correction ability.

BACKGROUND OF THE INVENTION

Such cutting tools include, for example, reamers, drills and end mills, typically for machining metals. Typically the tools are held in tool holders for fixing to a rotatable drive spindle of a machine tool Precise working of a workpiece by rotating cutting tools requires precise alignment of the tool axis with the axis of rotation of the spindle. Radial runout of the cutting tool may be due, for example, to axial displacement of the tool axis relative to the axis of rotation or due to spindle or tool axis angle errors relative to the axis of rotation of the spindle. Radial runout causes the cutting tool to rotate eccentrically, which leads to a corresponding loss of accuracy in the workpiece being machined.

Prior art that has addressed the problem of correcting radial runout includes, for example, GB 2356828; U.S. Pat. Nos. 4,776,734; 7,165,923; 7,037,053. Prior art cutting tools with runout correction suffer from a number of disadvantages. Just to mention a few, some are structurally complex. Some require dedicated runout correction devices that cannot be applied to existing cutting tools that do not have runout correction ability. Some only enable runout correction for a finite set of discrete radial directions. In some of the prior art cutting tools, a screw is used to apply a deflecting force. The screw has a frusto-conical bearing surface that applies a bending force directly to the cutting tool as it is being tightened. Consequently, the bearing surface will become worn due to friction as it rotates and simultaneously applies a bearing force to the cutting tool.

SUMMARY OF THE INVENTION

In accordance with the present invention there is provided a cutting tool comprising:

a shank having a circumferential groove;

an adjustment ring releasably secured to the shank at the groove, the adjustment ring comprising:

a threaded through bore in which a screw is screw mounted, the screw projecting inwardly of the adjustment ring for engaging the groove;

an adjustment member for engaging the groove, the adjustment member being positioned diametrically opposite the threaded through bore and projecting inwardly of the adjustment ring;

wherein the screw is rotatable in the threaded through bore to exert a purely radially directed force on the groove, thereby inducing displacement of the adjustment member radially inwardly, whereby the adjustment member exerts non-radially directed forces on the groove, thereby inducing a bending moment on the shank.

In accordance with some embodiments, the groove has a radially outwardly facing cylindrical inner wall and two side walls diverging radially outwardly from the inner wall.

In accordance with some embodiments, the adjustment member has an inwardly facing inner surface and two edge surfaces extending away from the inner surface and diverging away from each other.

In accordance with some embodiments, the groove has a radially outwardly facing cylindrical inner wall and the screw engages the inner wall and no other surface of the groove.

In accordance with some embodiments, the groove has two radially outwardly diverging side walls and the adjustment member engages the side walls of the groove and no other surface of the groove.

In accordance with some embodiments, the adjustment member has an inwardly facing inner surface and two edge surfaces extending away from the inner surface and diverging away from each other, the groove has a radially outwardly facing cylindrical inner wall and two side walls that diverge outwardly from the inner wall and wherein the adjustment member engages the side walls via the edge surfaces.

A cutting tool shank adjustment ring is also disclosed. The cutting tool shank adjustment ring has a peripheral inner surface and a peripheral outer surface, the peripheral inner surface defining a central through hole. Two support surfaces protrude inwardly from inner peripheral surface, the two support surfaces facing each other and being located diametrically opposite each other. A single threaded through bore connects the peripheral outer surface with the central through hole. An inwardly projecting adjustment member is located diametrically opposite the threaded through bore. The adjustment member comprises an inwardly facing inner surface which faces the single threaded through bore, and two edge surfaces extending away from the inner surface and diverging away from each other.

A cutting tool having a shank provided with a circumferential groove may have the aforementioned cutting tool shank adjustment ring mounted at the circumferential groove.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 1:
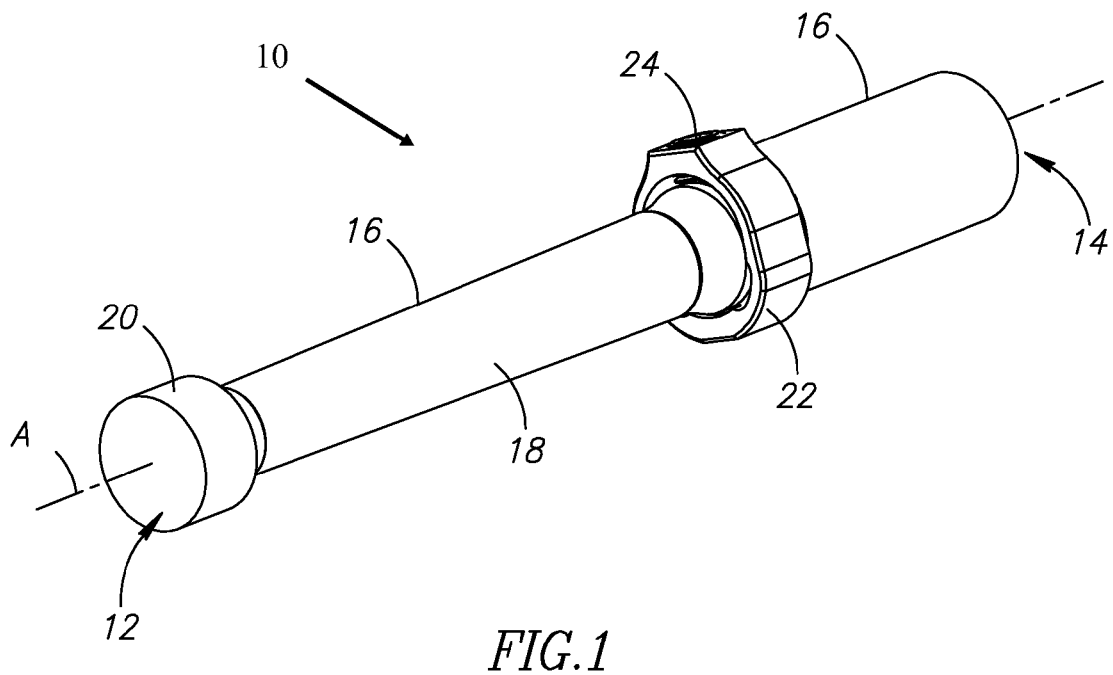
FIG. 1 is a perspective view of a cutting tool having an adjustable ring in accordance with embodiments of the present invention.
Figure 2:
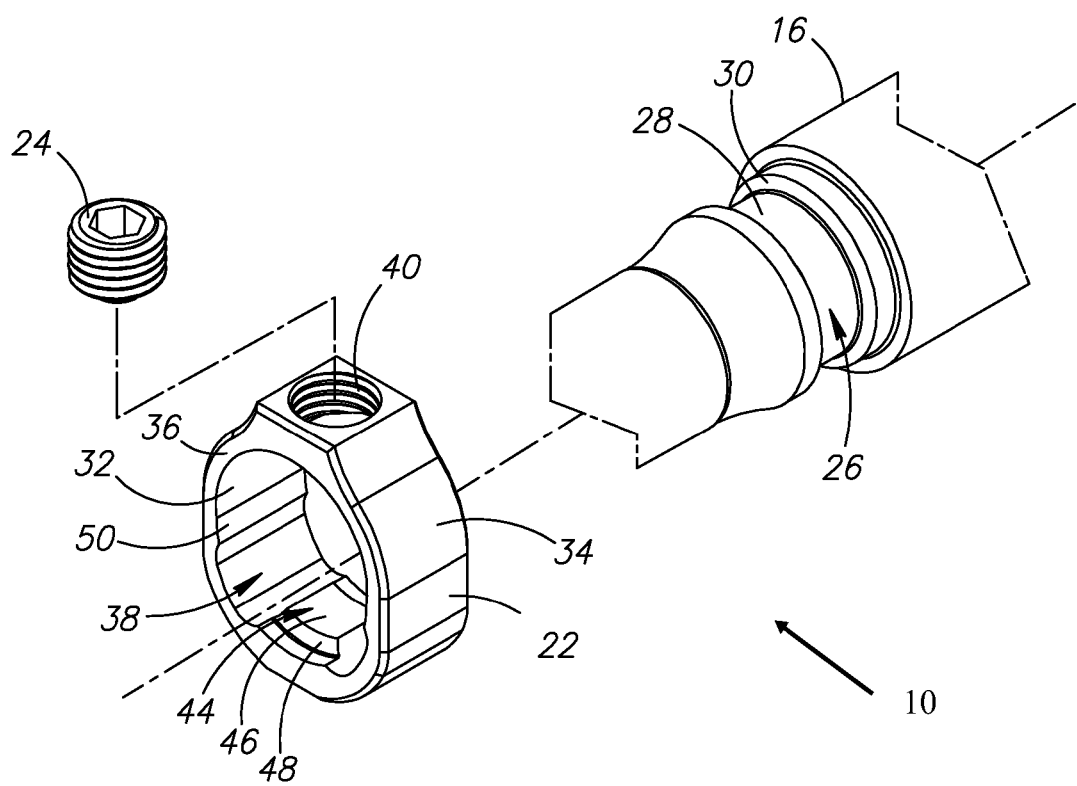
FIG. 2 is a partial exploded view of the cutting tool shown in FIG. 1.
Figure 3:
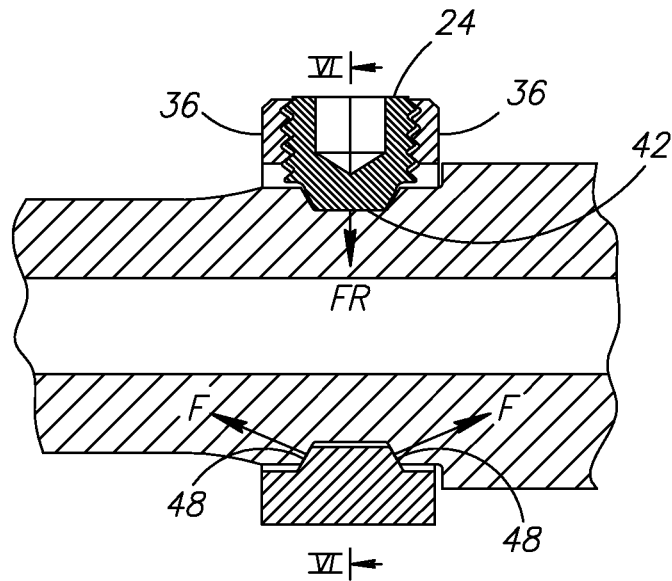
FIG. 3 is a partial longitudinal cross sectional view of the cutting tool shown in FIG. 1.

Reference is first drawn to the FIG. 1 showing a cutting tool 10 having a longitudinal axis A passing through forward and rear ends 12, 14 of the cutting tool 10. The cutting tool comprises a shank 16 having a peripheral surface 18 and a cutting head 20 at the forward end. It is understood that the specific shape of the cutting head 20 is not critical to the present invention, and so the cutting head may be formed as a drill, a reamer, or other tool. A section of the shank at the rear end is for securing in a tool holder. An adjustment ring 22, for adjusting radial runout is releasably secured to the shank 16 by means of a screw 24.

Figure 4:
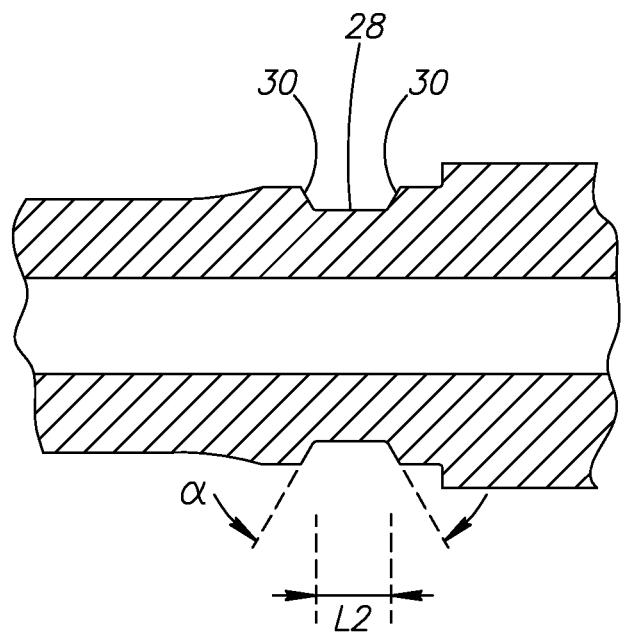
FIG. 4 is a partial longitudinal cross sectional view of the cutting tool shown in FIG. 1 with the adjustment ring removed.
Figure 5:
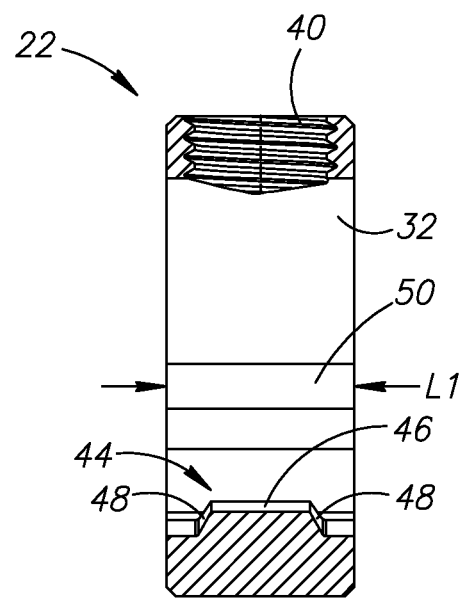
FIG. 5 is a longitudinal cross sectional view of the adjustment ring shown in FIG. 1.
Figure 6:
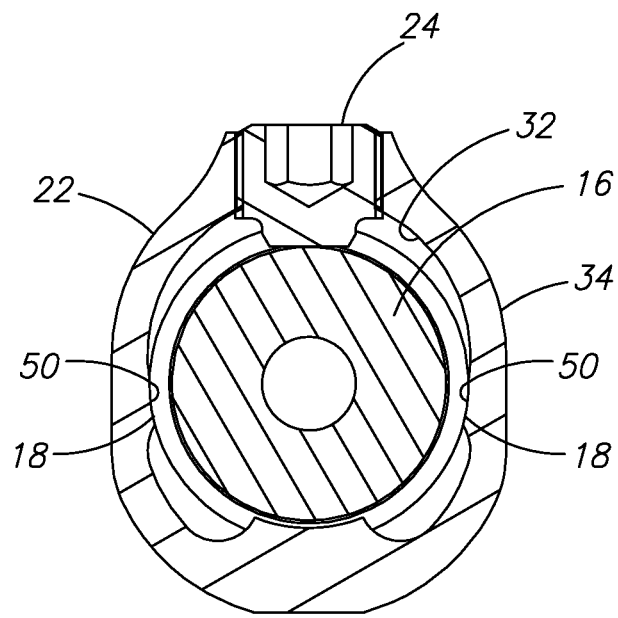
FIG. 6 is a cross sectional view of the cutting tool taken along the line VI-VI in FIG. 3.

Attention is now drawn to FIGS. 2 to 6. The shank 16 has a circumferential groove 26 with the adjustment ring 22 releasably secured to the shank 16 at the groove 26. The circumferential groove 26 has an inner wall 28 and two side walls 30. The inner wall 28 is cylindrical in shape and faces radially outwards. The side walls 30 diverge outwardly from the inner wall 28 to the peripheral surface 18 of the shank 16. The two side walls 30 form an acute a angle therebetween in a longitudinal cross section of the shank, as shown in FIG. 4.

The adjustment ring 22 is annular in form with inner and outer peripheral surfaces 32, 34 extending between opposing end surfaces 36 which face in opposite directions. The inner peripheral surface 32 defines a central through hole 38 in which the shank 16 of the cutting tool 10 is located. A threaded through bore 40 extends between the inner and outer peripheral surfaces 32, 34. The screw 24 is screw mounted in the threaded through bore 40 and projects inwardly of the adjustment ring 22. The screw 24 has bearing surface 42 adapted to engage the inner wall 28 of the groove 26 during adjustment of radial runout of the cutting tool 10. When the screw 24 is screw mounted in the threaded through bore 40 and engages the groove 26, the screw 24 engages the inner wall 28 of the groove 26 via the bearing surface 42. The screw 24 does not engage the side walls 30 of the groove 26 or any other surface of the groove 26. As seen in the figures of this embodiment, the adjustment ring 22 is provided with only a single such through bore 40 and so only a single screw 24 is mounted on the adjustment ring 22 and engages the shank 16.

An adjustment member 44 projects inwardly of the adjustment ring 22 from the inner peripheral surface 32 in a direction towards the threaded through bore 40 and is positioned diametrically opposite the threaded through bore 40. The adjustment member 44 has an inner surface 46 facing inwardly towards the threaded through bore 40 and two edge surfaces 48 extending away from the inner surface 46 and diverging away from each other. The inner surface 46 faces the bearing surface 42 of the screw 24. The two edge surfaces 48 form an acute angle therebetween in a longitudinal cross section of the shank, as can be seen, for example, in FIG. 5. When the adjustment ring 22 is releasably secured to the shank 16 at the groove 26 and the adjustment member 44 engages the groove 26, the adjustment member 44 engages the side walls 30 of the groove 26 via the edge surfaces 48. The adjustment member 44 does not engage the inner surface 46 of the groove 26 or any other surface of the groove 26.

The adjustment member 44 and the threaded through bore 40 divide the adjustment ring 22 into two halves. The adjustment ring 22 is provided with two support surfaces 50 that face each other and are located diametrically opposite each other. The support surfaces 50 protrude inwardly from inner peripheral surface 32. One support surface 50 is located on one half of the adjustment ring 22 and the other support surface 50 is located on the other half of the adjustment ring 22. Each support surface 50 has a minimum length dimension L1 which is greater than a maximum length dimension L2 of the groove.

In an initial position, prior to adjusting radial runout of the cutting tool 10, the adjustment ring 22 is loosely secured to the shank 16 at the groove 26 with the bearing surface 42 of the screw 24 slidably engaging the inner wall 28 of the groove 26 and the edge surfaces 48 of the adjustment member 44 slidably engaging the side walls of the groove 26. The support surfaces 50 preferably do not engage the peripheral surface 18 of the shank 16 in the initial position. In the initial position, the adjustment ring 22 can be continuously rotated about the axis A from an initial orientation to a final orientation corresponding to the direction in which radial runout adjustment is required. During the rotation of the adjustment ring 22 the bearing surface of the screw 24 slides on the inner wall 28 of the groove 26 and the edge surfaces 48 of the adjustment member 44 slide on the side walls of the groove 26.

When the adjustment ring 22 has reached the final orientation, the screw 24 is tightened. As the screw 24 is tightened it moves radially inwardly, relative to the threaded through bore 40, applies a purely radially directed force FR on the groove 26 thereby forcing the region of the adjustment ring 22 around the threaded through bore 40 to move radially outwardly away from the shank 16. The screw 24 applies a purely radially directed force FR on the groove 26 since only the bearing surface 42 of the screw 24 engages the groove 26 and it engages only the inner wall 28 of the groove 26. The radially outward movement of the region of the adjustment ring 22 around the threaded through bore 40 causes the adjustment member 44 to move radially inwardly further into the groove 26. Moreover, the support surfaces 50 will move radially inwardly until they engage the peripheral surface 18 of the shank 16. Each support surface 50 will engage the peripheral surface 18 of the shank 16 in a region adjacent the groove 26 and on either side of the groove 26. Therefore, by tightening the screw 24 the support surfaces 50 are movable from a first position, in which they do not engage the peripheral surface 18 of the shank 16, to a second position in which they engage the peripheral surface 18 of the shank 16.

As the adjustment member 44 moves radially inwardly into the groove 26 it applies non-radially directed forces F on the groove 26 via the engagement of the edge surfaces 48 of the adjustment member 44 with the side walls 30 of the groove 26. The non-radially directed forces F induce a bending moment on the shank 16 as the side walls 30 are pushed further apart adjacent the adjustment member 44, thereby increasing the acute angle a between the side walls 30 adjacent the adjustment member 44. As a result of the bending moment on the shank 16 the forward end 12 of the shank 16 moves radially away from the original location it was in, thereby adjusting the required radial runout.

Since the adjustment ring 22 is continuously rotatable through 360° about the axis A of the cutting tool 10 radial runout can be corrected in any required radial direction.

The adjustment ring of the present invention can be applied to cutting tools that were initially manufactured without a circumferential groove by simply forming a suitable circumferential groove, which corresponds in shape and dimensions to the adjustment ring, in their shanks.

The adjustment ring of the present invention is very simple in operation. It is only required to unscrew the screw 24 sufficiently to enable the adjustment ring 22 to be rotated to the required position and then the screw can be tightened in order to correct radial runout.

The screw 24 of the adjustment ring 22 only applies a radially directed force FR on the groove 26 of the shank 16 during radial runout correction of the cutting tool 10. Unlike many of the prior art radial runout correction mechanisms, the screw 24 of the present invention does not directly cause the bending moment on the shank 16. In many prior art radial runout correction mechanisms a bolt or screw is used which has a conical head and it is the conical head that applies a non radially directed force on a respective groove in the shank to "spread" the groove and thereby create a bending moment on the shank. Hence, in many prior art radial runout correction mechanisms, that part of the bolt or screw that applies a non-radially directed force does so during rotation of the screw. This is disadvantageous in that it causes wear of the conical head through friction.

Although the present invention has been described to a certain degree of particularity, it should be understood that various alterations and modifications could be made without departing from the scope of the invention as hereinafter claimed.

What is claimed is:

1. A cutting tool (10) comprising:
   a shank (16) having a circumferential groove (26);
   an adjustment ring (22) releasably secured to the shank (16) at the groove (26), the adjustment ring (22) comprising:
   a threaded through bore (40) in which a screw (24) is screw mounted, the screw (24) projecting inwardly of the adjustment ring (22) for engaging the groove (26);
   an adjustment member (44) for engaging the groove (26), the adjustment member (44) being positioned diametrically opposite the threaded through bore (40) and projecting inwardly of the adjustment ring (22); wherein
   the screw (24) is rotatable in the threaded through bore (40) to exert a purely radially directed force on the groove (26), thereby inducing displacement of the adjustment member (44) radially inwardly, whereby the adjustment member (44) exerts non-radially directed forces on the groove (26), thereby inducing a bending moment on the shank (16).

2. The cutting tool (10) according to claim 1, wherein the groove (26) has a radially outwardly facing cylindrical inner wall (28) and two side walls (30) diverging radially outwardly from the inner wall (28).

3. The cutting tool (10) according to claim 2, wherein the adjustment member (44) has an inwardly facing inner surface (46) and two edge surfaces (48) extending away from the inner surface (46) and diverging away from each other.

4. The cutting tool (10) according to claim 1, wherein the adjustment member (44) has an inwardly facing inner surface (46) and two edge surfaces (48) extending away from the inner surface (46) and diverging away from each other.

5. The cutting tool (10) according to claim 1, wherein the groove (26) has a radially outwardly facing cylindrical inner wall (28) and the screw (24) engages the inner wall (28) and no other surface of the groove (26).

6. The cutting tool (10) according to claim 1, wherein the groove (26) has two radially outwardly diverging side walls (30) and the adjustment member (44) engages the side walls (30) of the groove (26) and no other surface of the groove (26).

7. The cutting tool (10) according claim 1, wherein:
   the adjustment member (44) has an inwardly facing inner surface (46) and two edge surfaces (48) extending away from the inner surface (46) and diverging away from each other;
   the groove (26) has a radially outwardly facing cylindrical inner wall (28) and two side walls (30) that diverge outwardly from the inner wall (28); and
   the adjustment member (44) engages the side walls (30) via the edge surfaces (48).

8. The cutting tool (10) according to claim 7, wherein the screw (24) has a bearing surface (42) which engages the inner wall (28) of the groove (26).

9. The cutting tool (10) according to claim 8, wherein the adjustment ring (22) comprises two support surfaces (50) that face each other, are located diametrically opposite each other and protrude inwardly from inner peripheral surface (32).

10. The cutting tool (10) according to claim 9, wherein by tightening the screw (24) the support surfaces (50) are movable from a first position, in which they do not engage the peripheral surface (18) of the shank (16), to a second position in which they engage the peripheral surface (18) of the shank (16) and wherein each support surface (50) engages the peripheral surface (18) of the shank (16) in a region adjacent the groove (26) and on either side of the groove (26).

11. The cutting tool (10) according to claim 1, wherein the adjustment ring (22) comprises two support surfaces (50) that face each other, are located diametrically opposite each other and protrude inwardly from inner peripheral surface (32).

12. The cutting tool (10) according to claim 11, wherein by tightening the screw (24) the support surfaces (50) are movable from a first position, in which they do not engage the peripheral surface (18) of the shank (16), to a second position in which they engage the peripheral surface (18) of the shank (16) and wherein each support surface (50) engages the peripheral surface (18) of the shank (16) in a region adjacent the groove (26) and on either side of the groove (26).

13. The cutting tool (10) according to claim 1, wherein:
   only a single screw (24) is mounted on adjustment ring (22) and engages the shank (16).

14. A cutting tool (10) comprising:
   a shank (16) having a circumferential groove (26);
   an adjustment ring (22) releasably secured to the shank (16) at the groove (26), the adjustment ring (22) comprising:
   a peripheral inner surface (32) and a peripheral outer surface (34), the peripheral inner surface defining a central through hole (38) in which the shank is located;
   a threaded through bore (40) connecting the peripheral outer surface (34) with the central through hole (38);
   an inwardly projecting adjustment member (44) located diametrically opposite the threaded through bore (40); and
   a screw (24) screw mounted in the threaded bore (40) of the adjustment ring (22) and engaging the groove (26);
   wherein:
   the screw (24) exerts a purely radially directed first force on the groove (26) in a direction of the adjustment member (44); and
   the adjustment member (44) exerts non-radially directed forces on the groove (26).

15. The cutting tool (10) according to claim 14, wherein:
   the groove (26) has a radially outwardly facing cylindrical inner wall (28) and two side walls (30) diverging radially outwardly from the inner wall (28);
   the adjustment member (44) has an inwardly facing inner surface (46) and two edge surfaces (48) extending away from the inner surface (46) and diverging away from each other;
   the screw (24) engages the radially outwardly facing cylindrical inner wall (28) and does not engage the two side walls (30); and
   two edge surfaces (48) engage the two side walls (30) and does not engage the radially outwardly facing cylindrical inner wall (28).

16. The cutting tool (10) according to claim 15, wherein:
   the peripheral inner surface (32) of the adjustment ring (22) comprises two support surfaces (50) that face each other, are located diametrically opposite each other and protrude inwardly from inner peripheral surface (32); and
   the two support surfaces (50) engage the peripheral surface (18) of the shank.

17. The cutting tool (10) according to claim 14, wherein:
only a single screw (24) is mounted on the adjustment ring (22) and engages the shank (16).

18. The cutting tool (10) according to claim 17, wherein:
the non-radially directed forces exerted by the adjustment member (44) on the groove (26), induce a bending moment on the shank (16).

19. A cutting tool assembly (10) comprising:
a shank (16) having a circumferential groove (26);
an adjustment ring (22) comprising:
  a peripheral inner surface (32) and a peripheral outer surface (34), the peripheral inner surface defining a central through hole (38) shaped and sized to receive the shank (16);
  a threaded through bore (40) connecting the peripheral outer surface (34) with the central through hole (38);
  an inwardly projecting adjustment member (44) located diametrically opposite the threaded through bore (40); and
a screw (24) configured to be threadingly received in the threaded bore (40);
wherein the assembly is adjustable between:
a first position in which:
  the screw (24) is screw mounted in the threaded through bore (40) of the adjustment ring (22); and
  the adjustment ring (22) is loosely secured to the shank (16) at the groove (26) and can be rotated about the shank (16); and
a second position in which:
  the screw (24) exerts a purely radially directed first force on the groove (26) in a direction of the adjustment member (44);
  the adjustment member (44) exerts non-radially directed forces on the groove (26); and
  the adjustment ring (22) is no longer loosely secured to the shank (16) and cannot be rotated about the shank (16).

20. The cutting tool assembly (10) according to claim 19, wherein:
the groove (26) has a radially outwardly facing cylindrical inner wall (28) and two side walls (30) diverging radially outwardly from the inner wall (28);
the adjustment member (44) has an inwardly facing inner surface (46) and two edge surfaces (48) extending away from the inner surface (46) and diverging away from each other; and
in the second position:
  the screw (24) engages the radially outwardly facing cylindrical inner wall (28) and does not engage the two side walls (30); and
  two edge surfaces (48) engage the two side walls (30) and does not engage the radially outwardly facing cylindrical inner wall (28).

21. The cutting tool assembly (10) according to claim 20, wherein:
the peripheral inner surface (32) of the adjustment ring (22) comprises two support surfaces (50) that face each other, are located diametrically opposite each other and protrude inwardly from inner peripheral surface (32; and
in the second position:
  the two support surfaces (50) engage the peripheral surface (18) of the shank.

22. The cutting tool (10) according to claim 19, wherein:
only a single screw (24) is mounted on the adjustment ring (22) and engages the shank (16).

23. A cutting tool shank adjustment ring (22), comprising:
a peripheral inner surface (32) and a peripheral outer surface (34), the peripheral inner surface defining a central through hole (38);
two support surfaces (50) protruding inwardly from inner peripheral surface (32), the two support surfaces facing each other and located diametrically opposite each other;
a single threaded through bore (40) connecting the peripheral outer surface (34) with the central through hole (38); and
an inwardly projecting adjustment member (44) located diametrically opposite the threaded through bore (40), the adjustment member (44) comprising:
  an inwardly facing inner surface (46) which faces the single threaded through bore (40); and
  two edge surfaces (48) extending away from the inner surface (46) and diverging away from each other.

* * * * *